3,282,915
3-(DINITRO AND DIAMINOPHENYLAZO)ESTRA-1,3,5(10)-TRIEN-17β-OLS
James Jiu, Morton Grove, and Arthur H. Goldkamp, Deerfield, Ill., assignors to G. D. Searle & Co., Chicago, Ill., a corporation of Delaware
No Drawing. Filed June 15, 1959, Ser. No. 820,088
2 Claims. (Cl. 260—192)

The present invention relates to novel steroids which contain an amino or an amido substituent in the 3-position and is concerned more particularly with 17-oxygenated 3-amino- and 17-oxygenated 3-amidoestra-1,3,5 (10)-trienes and with intermediates in the manufacture of same. The 3-amino and 3-amido compounds of this invention can be represented by the structural formula

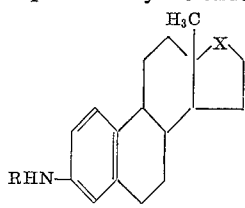

wherein R is selected from the group consisting of hydrogen, lower alkanoyl and benzoyl radicals; and X is selected from the group consisting of carbonyl, β-hydroxymethylene, β-(lower alkanoyl)oxymethylene and β-benzoyloxymethylene radicals. Lower alkanoyl radicals represented by R and included in the function X are exemplified by formyl, acetyl, propionyl, butyryl, caproyl, enanthyl, and caprylyl, said groups being the acyl radicals of alkanoic acids containing fewer than 9 carbon atoms.

Suitable starting materials for the manufacture of the 3-amino and 3-amido compounds of this invention are 10,17β-dihydroxyestra-1,4-dien-3-one and its 10-monoacetate. As a specific example, this dihydroxyketone is condensed with 2,4-dinitrophenylhydrazine in the presence of acetic acid to afford 3-(2,4-dinitrophenylazo)estra-1,3,5(10)-trien-17β-ol. The reaction presumably proceeds through the intermediate formation of the hydrazone, which rearranges with simultaneous elimination of the elements of water, as diagrammed below:

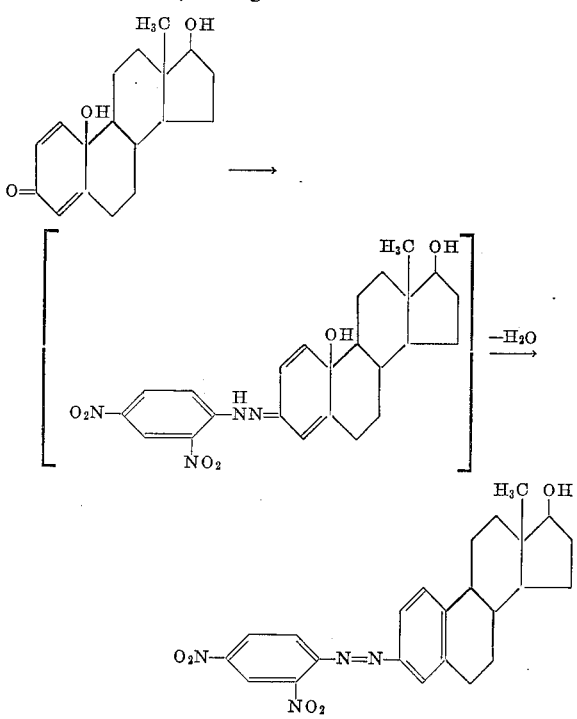

This azo compound is then treated with an appropriate reducing agent such as sodium hydrosulfite, resulting in 3-(2,4-diaminophenylazo)estra-1,3,5(10)-trien-17β-ol. The latter substance is reduced further by more drastic treatment with sodium hydrosulfite to yield 3-aminoestra-1,3,5(10)-trien-17β-ol. This amino-alcohol can be acylated, for example by reaction with a lower alkanoic acid anhydride in pyridine, to afford the O,N-di-(lower alkanoates) of this invention. For instance, 3-aminoestra-1,3,5(10)-trien-17β-ol is treated with acetic anhydride in pyridine, resulting in 3-acetamido-17β-acetoxyestra-1,3,5 (10)-triene. On the other hand, when this amino-alcohol is reacted with benzoyl chloride in pyridine, the instant 3-benzamido-17β-benzoyloxyestra-1,3,5(10)-triene is obtained.

Partial hydrolysis of the aforementioned amidoesters, typically by means of aqueous potassium hydroxide in ethanol, affords the 3-(lower alkanoyl)amidoestra-1,3,5 (10)-trien-17β-ols of this invention. The reaction of 3-acetamido-17β-acetoxyestra-1,3,5(10)-triene with aqueous potassium hydroxide in ethanol, for example, results in 3-acetamidoestra-1,3,5(10)-trien-17β-ol. Oxidation of these 3-(lower alkanoyl)amido-alcohols, typically by means of chromic acid in a suitable inert solvent, yields the instant 3-(lower alkanoyl)amidoestra-1,3,5(10)-trien-17-ones. The latter amides can be hydrolyzed, preferably with a mineral acid such as sulfuric acid, resulting in 3-aminoestra-1,3,5(10)-trien-17-one.

An alternate process for the preparation of the instant 17-oxygenated 3-amino and 17-oxygenated 3-amido compounds involves the use of 17β-hydroxy-19-nor-androst-4-en-3-one as the starting material. Reaction of the latter ketone with hydroxylamine hydrochloride in the presence of a suitable base such as pyridine results in a mixture of isomeric 3-isonitroso-17β-hydroxy-19-nor-androst-4-enes. This isomerism depends upon the ability of the isonitroso function to possess two alternative geometrical configurations. The isomers are commonly referred to as the syn and the anti forms, as is shown below:

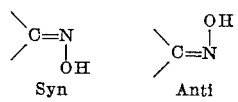

Syn   Anti

Although both isomeric forms of this substance have been isolated, an assignment of specific configuration is not necessary for the purposes of this invention. The invention is not restricted to the use of either of the isomers or of the mixture in the process described hereinafter, as any one of the three materials is suitable for that purpose. Treatment of the isomeric mixture, for example, with acetic anhydride and hydrogen chloride results in a transformation involving aromatization of the A ring and formation of the aforementioned 3-acetamido-17β-acetoxyestra-1,3,5(10)-triene. As is specified supra, this amidoester is readily convertible to the other 3-amino and 3-amido compounds of this invention.

The 3-amino and 3-amido compounds of this invention are useful as a result of their valuable pharmacological properties. They have, for example, the capacity to decrease the serum cholesterol/phospholipid ratio without at the same time producing the potent feminizing side-effects characteristic of known estrogens adapted to regulation of cholesterol metabolism.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight except where otherwise noted.

EXAMPLE 1

*3-(2,4-dinitrophenylazo)estra-1,3,5(10)-trien-17β-ol*

Method A.—To a solution of 7.8 parts of 10,17β-dihydroxyestra-1,4-dien-3-one in 250 parts of glacial acetic acid is added a solution of 5.9 parts of 2,4-dinitrophenylhydrazine in 500 parts of methyl Cellosolve and the mixture allowed to stand at room temperature for about 20 hours. The solid which precipitates during this reaction period is collected by filtration and recrystallized from methanol to afford pure 3-(2,4-dinitrophenylazo)-estra-1,3,5(10)-trien-17β-ol, M.P. 213–216°

Method B.—A solution of 8.3 parts of 10-acetoxy-17β-hydroxyestra-1,4-dien-3-one in 250 parts of glacial acetic acid is mixed with a solution of 5.47 parts of 2,4-dinitrophenylhydrazine in 500 parts of methyl Cellosolve, then allowed to stand at room temperature for about 53 hours. The resulting precipitate is collected by filtration to afford the product, which is identical with that prepared as described in Method A of this example.

EXAMPLE 2

*3-(2,4-diaminophenylazo)estra-1,3,5(10)-trien-17β-ol*

A mixture of 2.3 parts of 3-(2,4-dinitrophenylazo)estra-1,3,5(10)-trien-17β-ol, 10 parts of sodium hydrosulfite, 150 parts of methyl Cellosolve, and 50 parts of water is heated on the steam bath for about 2 hours. The reaction mixture is diluted with water, then extracted with chloroform. The organic layer is separated, washed with water, dried over anhydrous sodium sulfate, and evaporated to dryness in vacuo. The residue is adsorbed on silica gel and eluted with ethyl acetate-benzene, then recrystallized from ethyl acetate to afford pure 3-(2,4-diaminophenylazo)estra - 1,3,5(10) - trien - 17β-ol, M.P. 204–207°.

EXAMPLE 3

*3-aminoestra-1,3,5(10)-trien-17β-ol*

A mixture of 4.33 parts of 3-(2,4-diaminophenylazo)-estra-1,3,5(10)-trien-17β-ol, 31 parts of sodium hydrosulfite, 375 parts of methyl Cellosolve, and 125 parts of water is heated at reflux with stirring for about 22 hours. The reaction mixture is diluted with water, then extracted with an ethyl acetate-chloroform solution. The organic extracts are combined, washed with water, dried over anhydrous sodium sulfate, and evaporated to dryness in vacuo. Adsorption of the residue on alumina followed by elution of the column with ethyl acetate-benzene and recrystallization from methanol results in pure 3-aminoestra-1,3,5(10)-trien-17β-ol, M.P. 144–146°.

EXAMPLE 4

*3-isonitroso-17β-hydroxy-19-norandrost-4-ene*

A mixture of 21 parts of 17β-hydroxy-19-norandrost-4-en-3-one, 8 parts of hydroxylamine hydrochloride, 40 parts of pyridine, and 35 parts of ethanol is heated at reflux for about 30 minutes. The reaction mixture is cooled, diluted with ether and the resulting solution washed with water, dried over anhydrous sodium sulfate, and evaporated to dryness to afford 3-isonitroso-17β-hydroxy-19-norandrost-4-ene. This mixture of syn and anti isomers can be utilized directly in the next reaction as shown below. It can be separated into its isomeric components by the following procedure.

The mixture is adsorbed on a chromatographic column comprising fuller's earth and the cloumn eluted with cloroform. Fom this eluate is obtained a product which after recrystallization from methylene chloride-ether yields one of the pure isomers, M.P. 181–185; [α]_D=+88° (chloroform). Further elution of the column with 5% methanol in chloroform followed by recrystallization from methylene chloride-ether affords the second isomer, M.P. 201–203°; [α]_D=+189° (chloroform).

EXAMPLE 5

*3-acetamido-17β-acetoxyestra-1,3,5(10)-triene*

Method A.—A solution of the mixture of isomeric 3-isonitroso-17β-hydroxy-19-norandrost-4-enes, described in Example 4, in 180 parts of acetic acid in 80 parts of acetic anhydride is heated on the steam bath for about one hour. Heating is continued for about 2 hours longer while hydrogen chloride is passed through the mixture. The reaction mixture is then cooled and the precipitate collected by filtration, washed with acetic acid, and recrystallized from methanol to afford pure 3-acetamido-17β-acetoxyestra-1,3,5(10)-triene, M.P. 217–219°.

Method B.—A mixture of 4 parts of 3-aminoestra-1,3, 5(10)-trien-17β-ol, 100 parts of acetic anhydride and 500 parts of pyridine is allowed to stand at room temperature for about 19 hours, then diluted with water and extracted with ethyl acetate. The organic extracts are combined, washed with water, dried over anhydrous sodium sulfate, and evaporated to dryness at reduced pressure. The residue is adsorbed on silica gel, eluted with ethyl acetate-benzene and recrystallized from methanol to yield pure 3-acetamido-17β-acetoxyestra - 1,3,5(10)-triene, which is identical with the product obtained by Method A of this example.

EXAMPLE 6

*3-benzamido-17β-benzoyloxyestra-1,3,5(10)-triene*

A mixture of 7.61 parts of 3-aminoestra-1,3,5(10)-trien-17β-ol, 20 parts of benzoyl chloride and 50 parts of pyridine is heated on the stem bath for one hour, then allowed to stand at room temperature for about 22 hours. The reaction mixture is diluted with water and extracted with chloroform-ethyl acetate. The combined organic extracts are washed successively with dilute hydrochloric acid and water, dried over anhydrous sodium sulfate, and evaporated to dryness in vacuo. The residue is adsorbed on silica gel, eluted with ethyl acetate-benzene, and recrystallized from benzene-methanol to yield 3-benzamido-17β-benzoyloxyestra-1,3,5(10)-triene, M.P. 220–222°.

EXAMPLE 7

*3-butyramido-17β-butyroxyestra-1,3,5(10)-triene*

By substituting 155 parts of n-butyric anhydride in the process described in Example 4, Method B; 3-butyramido - 17β - butyroxyestra-1,3,5(10)-triene is obtained. This amidoester exhibits infrared maxima at 3.05, 5.79, 6.03, and 8.41 microns.

EXAMPLE 8

A mixture of 1.8 parts of 3-acetamido-17β-acetoxyestra-1,3,5(10)-triene, 10 parts of 10 N aqueous potassium hydroxide, and 90 parts of ethanol is heated at reflux for about 30 minutes. The reaction mixture is cooled, treated with ether, and the ether solution separated, washed with water, dried over anhydrous sodium sulfate and evaporated to dryness in vacuo. The residue is crystallized from ethanol to yield pure 3-acetamidoestra-1,3,5(10)-trien-17β-ol, M.P. 262–264°.

By substituting an equivalent quantity of 3-butyramido-17-butyroxyestra-1,3,5(10)-triene and otherwise proceeding according to the herein described processes, 3-butyramidoestra-1,3,5(10)-trien-17β-ol is obtained.

EXAMPLE 9

To a solution of 9 parts of 3-acetamidoestra-1,3,5(10)-trien-17β-ol in 320 parts of acetone is added, at 0°, 10.3 parts by volume of an aqueous solution containing 6.68 parts of chromium trioxide and 10.6 parts of concentrated sulfuric acid. The reaction mixture is kept at 0° for about 15 minutes, then treated with aqueous potassium bicarbonate and extracted with ethyl acetate. The organic solution is washed with water, dried over anhydrous sodium sulfate, and concentrated to dryness in vacuo. Adsorption of the residue on magnesiated silica followed by elution with ethyl acetate-benzene and successive recrystallization from methanol and ethyl acetate results in pure 3-acetamidoestra-1,3,5(10)-trien-17-one, M.P. 257–260°.

By substituting an equivalent quantity of 3-butyramido-estra-1,3,5(10)-trien-17β-ol and otherwise proceeding according to the herein described processes, 3-butyramido-estra-1,3,5(10)-trien-17-one is obtained.

What is claimed is:
1. 3 - (2,4-dinitrophenylazo)estra-1,3,5(10)-trien-17β-ol.
2. 3 - (2,4 - diaminophenylazo)estra-1,3,5(10)-trien-17β-ol

References Cited by the Examiner
UNITED STATES PATENTS
2,979,518   4/1961   Van Dorp et al. ___ 260—397.45

OTHER REFERENCES
Gold et al.: J.A.C.S., vol. 81, No. 9, May 9, 1959, pages 2198–2200.
Loewenthal: Tetrahedron, vol. 6, pp. 299–03 (1959).

CHARLES B. PARKER, *Primary Examiner.*

LESLIE H. GASTON, MAYER LIEBMAN, IRVING MARCUS, LEWIS GOTTS, *Examiners.*

N. K. SIEPMAN, N. S. MILESTONE, H. A. FRENCH, R. J. FINNEGAN, FLOYD D. HIGEL,
*Assistant Examiners.*